(12) United States Patent
Rune et al.

(10) Patent No.: US 10,798,678 B2
(45) Date of Patent: Oct. 6, 2020

(54) METHODS AND APPARATUSES FOR PAGING IN A WIRELESS COMMUNICATIONS NETWORK

(71) Applicant: Telefonaktiebolaget LM Ericsson (publ), Stockholm (SE)

(72) Inventors: Johan Rune, Lidingö (SE); Claes-Göran Persson, Mjölby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/321,053

(22) PCT Filed: Jan. 9, 2019

(86) PCT No.: PCT/SE2019/050011
§ 371 (c)(1),
(2) Date: Jan. 28, 2019

(87) PCT Pub. No.: WO2019/160463
PCT Pub. Date: Aug. 22, 2019

(65) Prior Publication Data
US 2020/0084746 A1   Mar. 12, 2020

Related U.S. Application Data

(60) Provisional application No. 62/630,864, filed on Feb. 15, 2018.

(51) Int. Cl.
*H04W 68/02* (2009.01)

(52) U.S. Cl.
CPC ................................. *H04W 68/02* (2013.01)

(58) Field of Classification Search
CPC ... H04W 68/00; H04W 68/02; H04W 68/005; H04W 68/10; H04W 68/12
See application file for complete search history.

(56) References Cited

U.S. PATENT DOCUMENTS 9,603,120 B2 *   3/2017   Eriksson ............... H04W 68/00
9,955,453 B2 *   4/2018   Rashid .................. H04W 68/02
(Continued)

OTHER PUBLICATIONS

Huawei, Hisilicon, "Efficiency of Direct and Response-driven Paging", 3GPP TSG-RAN WG2 #99bis, R2-1710541, Prague, Czech Republic, Oct. 9-13, 2017, 12 pages.
(Continued)

*Primary Examiner* — Magdi Elhag
(74) *Attorney, Agent, or Firm* — Murphy, Bilak & Homiller, PLLC

(57) ABSTRACT

According to a first aspect of embodiments herein, the object is achieved by a method performed by a User Equipment, UE, for handling a paging message in a wireless communications network. The UE configures (201) the UE to derive a group paging identifier to be associated with the UE from a first identifier associated with the UE, and to use the derived group paging identifier for identifying group paging identifier matches in response-driven paging, irrespective of UE state and initiator of the paging. The UE receives (202) a paging message from the wireless communications network. The paging message comprises the group paging identifier associated with the UE. The UE then derives (203) the group paging identifier associated with the UE from the first identifier associated with the UE. By means of the derived group paging identifier the UE identifies (204) group paging identifier matches in response-driven paging, irrespective of said UE states and initiator of the paging.

14 Claims, 9 Drawing Sheets

Method in UE 120

(56) References Cited

U.S. PATENT DOCUMENTS

| | | | |
|---|---|---|---|
| 10,660,036 B2* | 5/2020 | Lee | H04W 68/025 |
| 2009/0156236 A1* | 6/2009 | Jung | H04B 17/318 |
| | | | 455/458 |
| 2010/0004002 A1* | 1/2010 | Hahn | H04W 8/26 |
| | | | 455/456.1 |
| 2010/0260090 A1* | 10/2010 | Santhanam | H04W 68/025 |
| | | | 370/312 |
| 2011/0003603 A1* | 1/2011 | Park | H04W 68/02 |
| | | | 455/458 |
| 2012/0051279 A1* | 3/2012 | Li | H04W 68/00 |
| | | | 370/312 |
| 2012/0076085 A1 | 3/2012 | Chou et al. | |
| 2013/0136072 A1* | 5/2013 | Bachmann | H04W 68/00 |
| | | | 370/329 |
| 2017/0367069 A1* | 12/2017 | Agiwal | H04B 7/0695 |
| 2018/0368103 A1* | 12/2018 | Zhou | H04W 68/10 |
| 2019/0238345 A1* | 8/2019 | Gage | H04W 72/14 |
| 2020/0015194 A1* | 1/2020 | Li | H04W 76/12 |

OTHER PUBLICATIONS

Ericsson, "Indication of CN Initiated or RAN Initiated Paging", 3GPP TSG-RAN WG2 #101, Tdoc R2-1802341, Athens, Greece, Feb. 26-Mar. 2, 2018, 4 pages.

Ericsson, "Paging in RRC_Inactive", 3GPP TSG-RAN WG2 NR AH#3, Tdoc R2-1800361 (Revision of R2-1712520), Vancouver, Canada, Jan. 22-26, 2018, 4 pages.

Ericsson "Response-driven Paging to Reduce Beam Sweeping Overhead in NR", 3GPP TSG-RAN WG2 NR AH#3, Tdoc R2-1800355, Vancouver, Canada, Jan. 22-26, 2018, 4 pages.

Nokia, Alcatel-Lucent Shanghai Bell, "Paging in NR at HF operation", 3GPP TSG-RAN WG2 Meeting #96, R2-168124, Reno, USA, Nov. 14-18, 2016, 1-6.

Ericsson, "Response-driven paging to reduce beam sweeping overhead in NR", 3GPP TSG-RAN WG2#99, Tdoc R2-1708537, Berlin, Germany, Aug. 21-25, 2017, 1-3.

* cited by examiner

Fig. 2 Method in UE 120

Fig. 3 Method in network node 110, 130

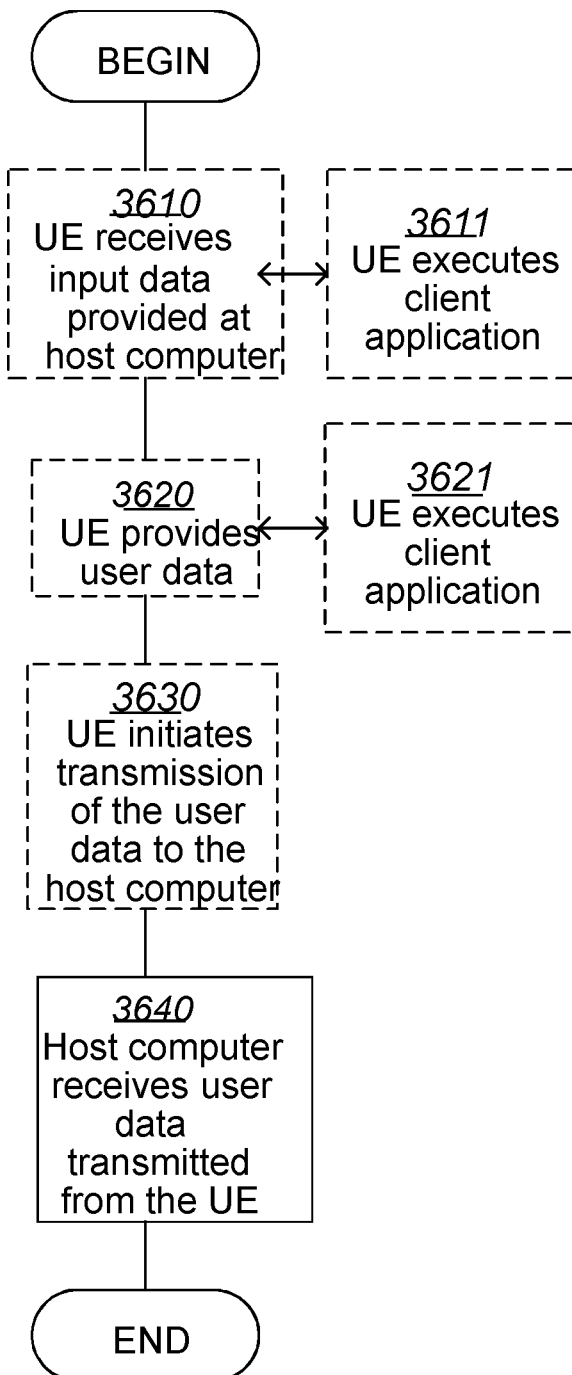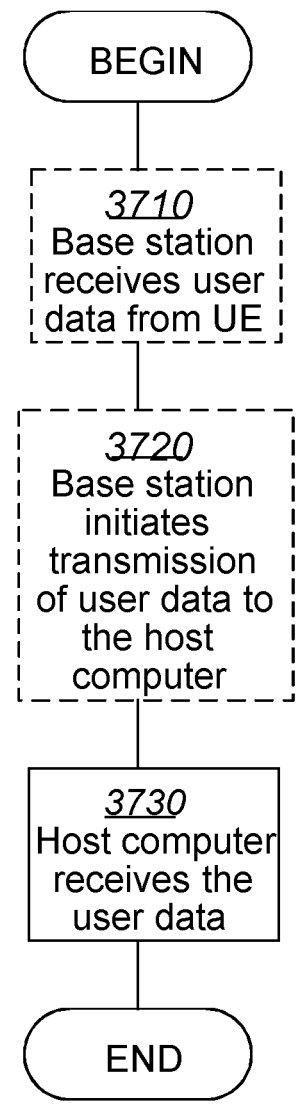
FIG 10
FIG 11

METHODS AND APPARATUSES FOR PAGING IN A WIRELESS COMMUNICATIONS NETWORK

TECHNICAL FIELD

Embodiments herein generally relate to a User Equipment, a network node and methods therein. More specifically, they relate to handling of a paging message in a wireless communications network.

BACKGROUND

In a typical wireless communication network, wireless devices, also known as wireless communication devices, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

An important property of the coming 5G system (e.g. NR), which is relevant also in the context of the present invention, is the usage of high carrier frequencies, e.g. in the range 6-100 GHz. For such high frequency spectrum, the atmospheric, penetration and diffraction attenuation properties can be much worse than for lower frequency spectrum. In addition, the receiver antenna aperture, as a metric describing the effective receiver antenna area that collects the electromagnetic energy from an incoming electromagnetic wave, is inversely proportional to the frequency, i.e., the link budget would be worse for the same link distance even in a free space scenario, if omnidirectional receive and transmit antennas are used. This motivates the usage of beamforming to compensate for the loss of link budget in high frequency spectrum. This is particularly important when communicating with UEs with poor receivers, e.g. low cost/low complexity UEs. Other means for improving the link budget include repetition of the transmissions (e.g. to allow wide beam or omnidirectional transmission) or use of Single Frequency Network (SFN) transmission from multiple TRPs in the same or different cells.

Due to the above described properties, in the high frequency bands, many downlink signals, such as synchronization signals, system information and paging, which need to cover a certain area (i.e. not just targeting a single UE with known location/direction), e.g. a cell, are expected to be transmitted using beam sweeping, i.e. transmitting the signal in one beam at a time, sequentially changing the direction and coverage area of the beam until the entire intended coverage area, e.g. the cell, has been covered by the transmission.

Paging is an essential function in a mobile telecommunications system. It is used by the network to contact a UE, primarily in order to transmit downlink data to the UE, once the UE has responded to the page. Paging can also be used to inform UEs of updates of the system information in a cell. It can also be used for informing UEs of an ongoing public warning such as ETWS.

In LTE, a UE in RRC_IDLE state camps on a cell and while camping it monitors the paging channel associated with that cell. The UE is configured to monitor repeatedly occurring paging occasions (POs) and may reside in a DRX sleep mode in between the paging occasions. When the UE is paged at such a paging occasion, the paging is indicated on the Physical Downlink Control Channel (PDCCH) in the form of a DL scheduling allocation addressed to the P-RNTI (which is shared by all UEs). This DL scheduling allocation indicates the DL transmission resources on the Physical Downlink Shared Channel (PDSCH), where the actual paging message is transmitted. A UE in RRC_IDLE state, which receives a DL scheduling allocation addressed to the P-RNTI at one of the UE's paging occasions, receives and reads the paging message from the allocated DL transmission resources to find out whether the paging message is intended for the UE. The UE(s) that is(are) subject to the paging is(are) indicated in the paging message through one or more UE paging identifiers (S-TMSI or IMSI), wherein each UE paging identifier is included in a paging record. Up to 16 UEs may be addressed, i.e. there may be up to 16 paging records in one paging message.

As mentioned above, in NR, paging has to be transmitted using beamforming transmission on high carrier frequencies, e.g. above 6 GHz, and hence beam sweeping (with up to 64 beams in the currently specified highest frequency bands) has to be used to cover an entire cell with the page. This creates a lot of control signalling overhead, especially since the paging signals typically have to be transmitted in multiple cells.

To reduce the control signalling overhead associated with paging on higher carrier frequencies, a group paging concept has been proposed where the paging identifier is associated with multiple UEs or a group of UEs (thereby the paging identifier is also known as a group paging identifier). The size of the initial DL message over the radio interface in the paging procedure is kept smaller by means of a shorter paging identifier (compared to using a full UE paging identifier as e.g. S-TMSI or IMSI. A UE receiving a paging message containing its group paging identifier need to contact the network to find out whether it is actually being paged or not. This concept is also known as response-driven paging.

In 3GPP there are currently two proposals discussed for how to allocate a group paging identifier to a UE. Both proposals are based on implicit allocation by deriving the group paging identifier from a UE ID. In one of the proposals, the UE ID is hashed into a bit in a bitmap, where each bit in the bitmap corresponds to one of the configured group paging identifiers (or, differently expressed, one of the configured paging groups). With this principle, whether a certain group paging identifier (or paging group) is targeted by a page is indicated by setting the corresponding bit in the bitmap to zero or one in the bitmap included in the paging message In the other proposal, the group paging identifier is derived by truncating the UE ID, or a certain unique part of the UE ID, from the most significant bit (MSB) direction or from the least significant bit (LSB) direction to a shorter identifier. In a generalized form the second proposal could be that the UE ID is hashed to a shorter identifier using an arbitrary hash function.

If the bitmap approach is used, the paging information includes the bitmap and the one or more bit(s) that is/are set in the bitmap indicate(s) the group paging identifier(s) of the UE(s) targeted by the page. If the truncated UE ID (or hashed UE ID) approach is used, the paging information includes one or more truncated (or hashed) f UE ID(s) targeted by the page.

Another paging related potential feature in NR is the (not yet agreed in 3GPP) PDCCH only paging, a.k.a. DCI Paging. With this feature, only the PDCCH transmission (addressed to the P-RNTI) would be used, while the regular RRC Paging message sent on the PDSCH would be omitted. Hence, all the relevant paging information must be confined to the DCI on the PDCCH, consequently this DCI can be referred to as Paging DCI. This works well when the paging is only used for indication of updates of the system information (including ETWS, CMAS and EAB parameter updates), similar to the Direct Indication Information mechanism in LTE. However, for NR, DCI Paging may be used also for regular paging (i.e. not just for updates of the system information etc.) in cases where the paging related data to be included is small, e.g. when only a single UE is being paged or when response-driven paging is used.

In NR, paging may be used for a UE in either RRC_IDLE state or in RRC_INACTIVE state. In the former case, the paging is initiated by the Core Network (CN) (which for 5G is also referred to as Next Generation Core (NGC) or 5G Core (5GC)), while in the latter case, the paging is initiated by the RAN (which for 5G is also referred to as Next Generation RAN (NG-RAN)), e.g. an anchor gNB where the UE's RAN context is stored. For robustness reasons, in case of a state mismatch between the network and the UE, a UE in RRC_INACTIVE state can also be reached by CN initiated paging. The same RRC Paging message sent on the PDSCH is expected to be used for both kinds of paging, i.e. irrespective of whether the paging is initiated by the CN or the RAN. Likewise, if the concept of DCI Paging will be used in NR, the same Paging DCI sent on PDCCH is expected to be used for both CN initiated paging and for RAN initiated paging.

A UE in RRC_INACTIVE state should act differently depending on whether the CN or the RAN initiates the paging. When receiving a RAN initiated paging, the UE in RRC_INACTIVE state should access the network to request to resume the RRC connection. When receiving a CN initiated paging, the UE in RRC_INACTIVE state should enter RRC_IDLE state and access the network to request to establish a new RRC connection. The UE can determine the initiator of the paging from the type of UE identifier used in the Paging message. If the paging is initiated by the CN, the UE identifier included in the Paging message is a CN (NAS) identifier, i.e. the S-TMSI or the IMSI, while if the paging is initiated by the RAN, the UE identifier included in the Paging message is a RAN identifier, i.e. the I-RNTI.

A UE in RRC_IDLE state should only expect to receive a CN initiated paging containing its CN identifier.

SUMMARY

An object of embodiments herein is to improve the performance of a wireless communications network using paging.

According to a first aspect of embodiments herein, the object is achieved by a method performed by a User Equipment, UE, for handling a paging message in a wireless communications network. The UE is configured to derive a group paging identifier to be associated with the UE from a first identifier associated with the UE, and to use the derived group paging identifier for identifying group paging identifier matches in response-driven paging, irrespective of UE state and initiator of the paging. The UE receives a paging message from the wireless communications network. The paging message comprises the group paging identifier associated with the UE. The UE then derives the group paging identifier associated with the UE from the first identifier associated with the UE. By means of the derived group paging identifier the UE identifies group paging identifier matches in response-driven paging, irrespective of said UE states and initiator of the paging.

According to another aspect of embodiments herein, the object is achieved by a method performed by a network node for configuring a UE to handling a paging message in a wireless communications network. The network node configures the UE to derive a group paging identifier, to be associated with the UE from a first identifier associated with the UE, and to use the derived group paging identifier for identifying group paging identifier matches in response-driven paging, irrespective of UE state and initiator of the paging. The network node then sends a paging message to the UE. The paging message comprises the group paging identifier associated with the UE enabling the UE to derive the group paging identifier associated with the UE from the first identifier associated with the UE, and to by means of the derived group paging identifier identify group paging identifier matches in response-driven paging, irrespective of said UE states and initiator of the paging.

According to another aspect of embodiments herein, the object is achieved by a User Equipment, UE, for handling a paging message in a wireless communications network. The UE is configured to:

Configure the UE to derive a group paging identifier to be associated with the UE 120 from a first identifier associated with the UE, and to use the derived group paging identifier for identifying group paging identifier matches in response-driven paging, irrespective of UE state and initiator of the paging, receive a paging message from the wireless communications network, and which paging message is adapted to comprise the group paging identifier associated with the UE, derive the group paging identifier associated with the UE from the first identifier associated with the UE, and by means of the derived group paging identifier identify group paging identifier matches in response-driven paging, irrespective of said UE states and initiator of the paging.

According to another aspect of embodiments herein, the object is achieved by a method performed by a network node for configuring a UE to handling a paging message in a wireless communications network. The network node is configured to:

Configure the UE to derive a group paging identifier, to be associated with the UE from a first identifier associated with the UE, and use the derived group paging identifier for identifying group paging identifier matches in response-driven paging, irrespective of UE state and initiator of the paging, and send a paging message to the UE, which paging message comprises the group paging identifier associated with the UE enabling the UE to derive the group paging identifier associated with the UE from the first identifier associated with the UE, and to by means of the derived group paging identifier identify group paging identifier matches in response-driven paging, irrespective of said UE states and initiator of the paging.

BRIEF DESCRIPTION OF THE DRAWINGS

Examples of embodiments herein are described in more detail with reference to attached drawings in which:

FIGS. 8-11 are flowcharts illustrating methods implemented in a communication system including a host computer, a base station and a user equipment.

DETAILED DESCRIPTION

Figure 1:
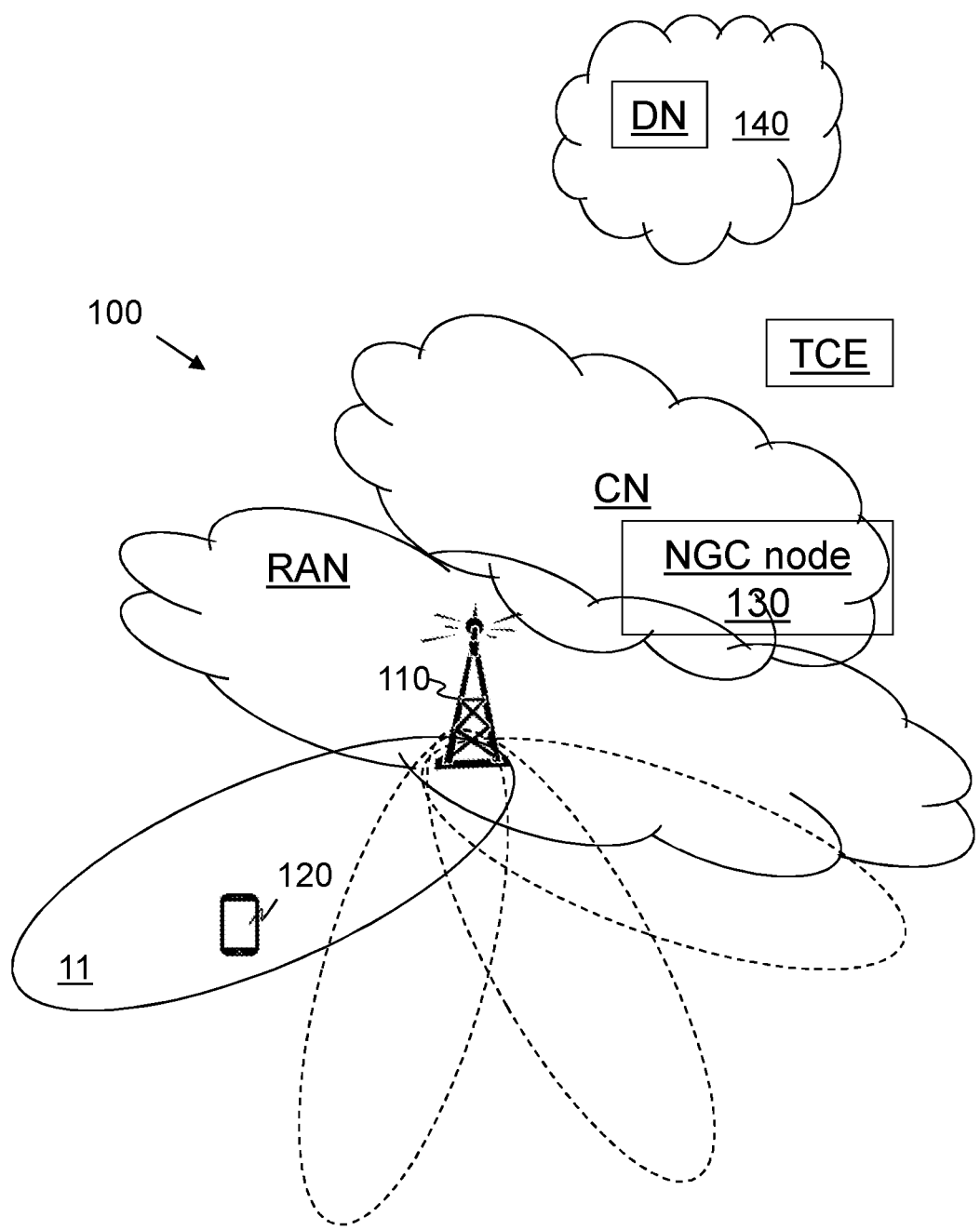
FIG. 1 is a schematic block diagram illustrating embodiments of a wireless communications network.

As a part of developing embodiments herein a problem will first be identified and discussed.

A problem that has not been foreseen when designing the principle for a UE in RRC_INACTIVE state monitoring the paging channel for both RAN initiated and CN initiated paging arises when response-driven paging is introduced with its concept of group paging identifiers derived from a UE ID. The derivation of the group paging identifier (or paging group) from the UE ID (by hashing or truncating) depends on which UE ID it is derived from (this applies to both the bitmap approach and the truncated UE ID approach) and a UE cannot unambiguously determine whether it is targeted by the page even if it finds a possible match in the paging message, since it does not know whether the group paging identifier was derived from the S-TMSI or the I-RNTI (or some other UE ID).

Another issue caused by the introduction of the RRC_INACTIVE state is that a UE in RRC_IDLE state may be unintentionally triggered by a RAN initiated page. As described above in section 2.1, the UE determines the initiator of the page (CN or RAN) from the type of UE identifier included in the Paging message. When a regular Paging message is sent, the UE needs to read the Paging message sent on PDSCH to find out whether the page is initiated by the CN or by the RAN. When response-driven paging is introduced the Paging message (or the Paging DCI) includes a group paging identifier, from which the UE cannot determine the initiator of the page, thus in this case the UE needs to access the network to find out whether the page is initiated by the CN or by the RAN.

The problems described above may cause a substantial number of redundant network accesses and DL responses when UEs want to be informed of whether they are paged or not, thus consuming network resources and UE energy in vain (gradually draining the battery) and causing increased interference in the network.

The RRC_INACTIVE state is a new state introduced in NR which does not exist in LTE (but 3GPP has agreed to introduce such a state in LTE too). The purpose of the RRC_INACTIVE state is to reduce the signalling overhead over the radio and network interfaces and to improve the UE access latency as well as UE energy consumption. In this state, the Core Network (CN) still regards the UE as connected, thus the CN-RAN connection is kept active although the RRC connection between the gNB and the UE is released. In order to reduce radio interface signalling at connection establishment, the context information is kept active in the UE and in the gNB which enables the UE to resume its RRC connection when it is paged or has UL data or signalling to send. When the CN has user data or control data to send to the UE, the data is sent to the anchor gNB which then initiates the paging of the UE (a.k.a. a RAN initiated paging). In RRC_INACTIVE, the UE can move around in a RAN Notification Area (RNA) configured by the network, without informing the network of its location within the RNA. When the UE leaves its configured RNA, the UE informs the network. If too long time elapses without communication between the UE and the network, the UE sends a periodic RAN Area Update to the network, even if it has not left its configured RNA.

Some embodiments herein relate to Indication of paging initiator at CN and RAN initiated paging. Determination of group paging identifier at response-driven paging.

The above described problem is addressed in a number of embodiments, some of which should be seen as alternatives, while some may be used in combination. Two main principles are reflected in the embodiments:

In one embodiment the uncertainty of which UE ID the group paging identifier is derived from in response-driven paging is removed by mandating that the same UE ID always is used as the derivation source, irrespective of whether the paging is initiated by the CN or the RAN (this is referred to as unified group paging identifier derivation).

In other embodiments, the initiator of the paging (the CN or the RAN), or the UE ID from which the group paging identifier (or paging group) is derived from in response-driven paging, is indicated on the PDCCH or the PDSCH (or in PDCCH configuration parameters).

For unified group paging identifier derivation, the S-TMSI is preferred as the input to the derivation.

The other embodiments comprise paging initiator (or group paging identifier derivation source) indication through different P-RNTIs, explicit indication(s) in the DCI on the PDCCH, explicit indication(s) in the PDSCH message or through separate paging channels.

Advantages of embodiments herein at least comprises:

A UE in RRC_INACTIVE state can unambiguously determine if its group paging identifier is included in the page when response-driven paging is used. Thereby, a significant amount of redundant network accesses can be avoided and UE energy can be saved.

Furthermore, since a UE can determine already from the DCI (e.g. from the CRC check when the P-RNTI is used as the indicator) on the PDCCH whether the paging is initiated by the CN or by the RAN, a UE in RRC_IDLE state can omit checking for presence of its UE ID (e.g. S-TMSI) or group paging identifier (i.e. group paging identifier derived from the UE ID) in the paging information on the PDSCH (or DCI on the PDCCH which the UE can stop parsing after detecting the indication). In cases where response-driven paging is used, a significant amount of redundant network accesses can be avoided and UE energy can be saved.

For embodiments 2 a further advantage is that a UE in RRC_IDLE state may abort further PDCCH processing and omit possible PDSCH processing if it detects that the paging is initiated by the RAN (irrespective of whether response-driven paging or regular paging is used). For embodiment 3 a UE in RRC_IDLE state can skip parts of the PDSCH processing, if the paging is initiated by the RAN, and for embodiment 4 a UE in RRC_IDLE state will not even receive a page initiated by the RAN.

Embodiments herein relate to wireless communication networks in general. FIG. 1 is a schematic overview depicting a wireless communications network 100. The wireless communications network 100 comprises one or more RANs and one or more CNs. The wireless communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 100, wireless devices e.g. one or more UE 120 such as a mobile station, a non-access point (non-AP) STA, a STA, a user equipment and/or a wireless terminals, communicate via one or more Access Networks (AN), e.g. RAN, to one or more core networks (CN) comprising at least one NGC node 130, also referred to as 5GC node. It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless communications network 100 comprises a network node 110 providing radio coverage over a geographical area, a service area 11, which may also be referred to as a beam or a beam group of a first radio access technology (RAT), such as 5G, LTE, Wi-Fi or similar. The network node 110 may be a NG-RAN node, transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the network node 110 depending e.g. on the first radio access technology and terminology used. The network node 110 may be referred to as a serving radio network node and communicates with the UE 120 with Downlink (DL) transmissions to the UE 120 and Uplink (UL) transmissions from the UE 120.

The network node 110 may be referred to as an anchor network node or anchor gNB, this may e.g. be since it is in this node the UE's RAN context, i.e. state information, is stored and it is this node that maintains the RAN-CN connection pertaining to the UE, while the UE is in RRC_INACTIVE state.

Methods herein may be performed by the network node 110 or the core network node 130. As an alternative, a Distributed Node (DN) and functionality, e.g. comprised in a cloud 140 as shown in FIG. 1, may be used for performing or partly performing the methods.

The above described problem is addressed in a number of embodiments, some of which should be seen as alternatives, while some may be used in combination.

Embodiment 1: Unified Group Paging Identifier Derivation

With this embodiment, the ambiguity of which UE ID that is the basis for the derived group paging identifier (i.e. the UE ID from which the group paging identifier is derived) is removed by mandating that the same UE ID always is used, irrespective of whether the paging is initiated by the CN or the RAN.

A UE, such as the UE 120, always has a CN assigned identifier, i.e. the S-TMSI, regardless if the UE is in RRC_IDLE state or in RRC_INACTIVE state, whereas a RAN assigned UE identifier is available only in RRC_INACTIVE state but not in RRC_IDLE state. Hence, the preferred choice of UE identifier to derive the group paging identifier (or paging group in case a bitmap is used) from is the S-TMSI. Hence, when the bitmap approach is used, the S-TMSI is used to derive which bit in the bitmap that represents the group paging identifier—or paging group—that is allocated to the UE. If the approach to truncate or hash the UE ID is used, the S-TMSI, or a certain part of it, is truncated or hashed into a shorter group paging identifier.

As mentioned above, the group paging identifier (or paging group) may be derived from a certain unique part of the S-TMSI, e.g. the Mobility Management Entity-TMSI (M-TMSI).

Note that it is only when the group paging identifier is derived that the S-TMSI should be used for both CN initiated and RAN initiated paging according to this embodiment. When a UE, such as the UE 120, which receives a page with a matching group paging identifier, requests the full paging message (or the list of UE ID(s) of the paged UE(s)) from the network, such as the wireless communications network 100, the network will return different UE IDs depending on whether the paging is initiated by the CN or the RAN (i.e. the S-TMSI for CN initiated paging and the I-RNTI for RAN initiated paging).

To support this method when the UE 120 is in RRC_I-NACTIVE state and paging is initiated by the RAN (i.e. by the anchor gNB, such as the NG-RAN node 110), the CN must transfer the UE's S-TMSI, also referred to as 5G-S-TMSI, or the part of the S-TMSI from which the group paging identifier is derived, to the RAN (i.e. to the anchor gNB such as the NG-RAN node 110). This is preferably done when the UE context is established in the anchor gNB, e.g. in a message from the CN, such as the NGC node 130, also referred to as 5GC node 130, (e.g. the AMF) to the gNB in a message corresponding to or similar to the S1AP Initial Context Setup Request message in LTE. The S-TMSI, or the part of it from which the group paging identifier is derived, is stored in the UE context in the anchor gNB and is transferred to the target gNB in case of an inter-gNB handover in RRC_CONNECTED state. If the anchor gNB is changed in RRC_INACTIVE state, e.g. due to a RNA Update, the S-TMSI, or the part of it from which the group paging identifier is derived, is transferred to the new anchor-gNB with the context fetch procedure. If the S-TMSI is changed, e.g. after an inter-CN node handover such as an inter-AMF handover in RRC_CONNECTED state, or a change of anchor gNB (e.g. due to a RNA Update) in RRC_INACTIVE state, the CN transfers the new S-TMSI, or the part of it from which the group paging identifier is derived, to the new anchor gNB.

An alternative to proactively transferring the S-TMSI, or the part of it from which the group paging identifier is derived, from the CN to the RAN when the UE context is established in the RAN could be that the anchor gNB requests it from the CN (e.g. from the AMF) when the UE is switched from RRC_CONNECTED to RRC_INACTIVE state. If a change of CN node causes the S-TMSI to be updated, the S-TMSI, or the part of it from which the group paging identifier is derived, could be either requested from the anchor gNB or proactively transferred by the CN (e.g. the AMF) to the anchor gNB.

Another (less preferred) alternative could be that the anchor gNB requests the S-TMSI, or the part of it from which the group paging identifier is derived, from the CN only when it is needed. For instance, the anchor gNB could request the S-TMSI, or the part of it from which the group paging identifier is derived, from the CN when RAN initiated paging of a UE in RRC_INACTIVE state is triggered.

Yet another alternative could be that the CN does not transfer the S-TMSI, or the part of it from which the group paging identifier is derived, to the RAN, but instead derives the group paging identifier and transfers the derived group paging identifier to the RAN. Note that in order for this alternative to work, the derivation algorithm must not contain any RAN specific identifier or parameter, which may vary between different cells or between different gNBs.

For CN initiated paging such as by the NGC node 130 the S-TMSI is included in the paging instruction message from the CN to the RAN for regular paging and this principle could be kept also for response-driven paging. This message could be sent from the AMF to a gNB and could be a message corresponding to the S1AP Paging message sent from an MME to an eNB in EPS/LTE.

In general, it is preferable that the RAN decides whether regular paging or response-driven paging should be used and the CN does not even have to know which paging type that is used (as long as it transfers the S-TMSI, or the part of it from which the group paging identifier is derived, to the RAN, as described above, to enable the RAN to initiate potential RAN initiated response-driven paging).

In rare error cases it may happen that no S-TMSI is available for a UE that is to be paged. To handle such cases, the 3GPP LTE standard, and presumably also the NR standard, when the specification work on the NR standard has progressed further, allows paging with the IMSI as the UE identifier. In such scenarios, this embodiment obviously cannot be used, since there is no S-TMSI to derive the group paging identifier from. Instead, regular paging (i.e. not response-driven paging) has to be used when no S-TMSI is available.

An alternative could be to use the IMSI, or a certain unique part of the IMSI, instead of the S-TMSI as the UE ID to always derive the group paging identifier (or paging group) from.

This embodiment is equally applicable irrespective of whether the bitmap or truncated (hashed) UE ID representation method is used for the group paging identifier.

Embodiment 2: Indication of Paging Initiator on the PDCCH

An alternative, or complement, to the unified group paging identifier derivation of embodiment 1 is to indicate on the PDCCH whether the CN such as the NGC node 130 or the RAN such as the NG-RAN node 110 initiated the paging. This may be done either by using dedicated P-RNTIs or one or more explicit parameter(s) in the DCI on the PDCCH. Note that when not combined with embodiment 1, indicating whether the CN or the RAN initiated the paging is equivalent to indicating whether the group paging identifier is derived from the S-TMSI or the I-RNTI. This excludes the exceptional error cases where the S-TMSI is not available and the IMSI therefore is used instead. In such cases, regular paging (i.e. not response-driven paging) has to be used, unless the extension described in section 5.5 is used.

Embodiment 2a: Indication of Paging Initiator Using P-RNTIs

With this embodiment, the paging initiator (i.e. whether the paging is initiated by the CN or by the RAN) is indicated by the P-RNTI to which the PDCCH transmission is addressed. The following are three alternatives for this mechanism:

Alternative 1:

Two RNTIs are configured (specified, i.e. hardcoded in the standard, or dynamically configured via the system information) to be dedicated P-RNTIs. One of them indicates that the paging is initiated by the CN such as the NGC node 130 and the other one indicates that the paging is initiated by the RAN such as the NG-RAN node 110. This embodiment may be used together with embodiment 1, i.e. with a unified derivation of the group paging identifier irrespective of the initiator of the paging, e.g. always deriving the group paging identifier from the S-TMSI, or a certain unique part of it. However, this embodiment also allows that the group paging identifier can be derived from different UE identifiers for CN initiated and RAN initiated paging, e.g. derived from the S-TMSI, or a certain unique part of it, when the paging is initiated by the CN and derived from the I-RNTI when the paging is initiated by the RAN.

If the group paging identifier is derived from different UE identifiers for CN initiated and RAN initiated paging, then this embodiment alternative can only be applied with the same paging initiator for all pages in cases where multiple UEs area paged simultaneously (i.e. multiple UEs are included in the same paging message on the PDCCH or the same Paging DCI on the PDCCH). To enable paging of UEs with different paging initiators simultaneously (using response-driven paging), either one of the other embodiment alternatives below would have to be used or two parallel paging channels would have to be configured, so that one of them could be used for paging initiated by the CN and one for paging initiated by the RAN, and a UE in RRC_INACTIVE state would have to monitor both these paging channels.

This embodiment alternative not only removes the ambiguity in what UE ID the group paging identifier is derived from, but also potentially reduces the processing in the UEs. The latter can be achieved, since a UE in RRC_IDLE state can abort the processing after concluding that the received DCI is not addressed to the P-RNTI indicating CN initiated paging. This is an obvious advantage when the major part of the paging information is transmitted on the PDSCH, but some processing can also be saved when the paging information is confined to the DCI on the PDCCH, since the UE, such as the UE 120, may abort the processing already after the CRC calculation but before the parsing of the actual DCI content.

Alternative 2:

This alternative differs from alternative 1 in that three RNTIs are configured (specified, i.e. hardcoded in the standard, or dynamically configured via the system information) to be dedicated P-RNTIs. The three P-RNTIs (e.g. P-RNTI1, P-RNTI2 and P-RNTI3) indicate:

P-RNTI1=CN initiated paging
P-RNTI2=RAN initiated paging
P-RNTI3=Mixed CN initiated and RAN initiated paging Note that P-RNTI3 can only be used together with regular paging or with response-driven paging with unified derivation of the group paging identifier for CN initiated and RAN initiated paging (as in embodiment 1). Moreover, when P-RNTI3 is used, there is no potential for the kind of processing reduction described above for alternative 1. The only purpose of P-RNTI3 is to complement P-RNTI1 and P-RNTI2 to enable mixing of paging types at the same time (i.e. included in the same paging message on the PDSCH or the same Paging DCI on the PDCCH).

Alternative 3:

This alternative differs from alternative 1 in that the P-RNTI for CN initiated paging also is used for a mix of CN initiated and RAN initiated pages. That is, two P-RNTIs would be configured (specified, i.e. hardcoded in the standard, or dynamically configured via the system information) as follows:

P-RNTI1=Only CN initiated paging or a mix of CN and RAN initiated paging
P-RNTI2=RAN initiated paging Embodiment 2b: Indication of Paging Initiator Using DCI Parameter(s)

With this embodiment the initiator of the paging (i.e. RAN such as the NG-RAN node 110 or CN such as the NGC node 130 initiated paging) is indicated by an explicit parameter in the DCI on the PDCCH2. This embodiment is useful for both regular paging and response-driven paging.

If PDCCH only paging (DCI Paging) is used together with response-driven paging, a single common paging indicator could be used for the entire Paging DCI, or one paging indicator per paged UE, such as the UE 120, may be used, e.g. one indicator per included group paging identifier (i.e. one per bit, or activated bit, in the bitmap case and one per truncated (or hashed) UE identifier in the truncated (hashed) UE ID case).

If paging using PDCCH and PDSCH transmissions is used, the parameter in the DCI would be valid for all the UEs being paged (i.e. no mixing of different paging types).

Embodiment 3: Indication of Paging Initiator on the PDSCH

With this embodiment the initiator of the paging (i.e. RAN such as the NG-RAN node 110 or CN such as the NGC node 130 initiated paging) is indicated by an explicit parameter in the paging information on the PDSCH. This embodiment is useful in combination with response-driven paging, since with regular paging the paging type (i.e. CN initiated or RAN initiated) is inherently indicated by the UE ID in the paging message on the PDSCH.

The parameter could be one indicator for the entire PDSCH message (i.e. no mixing of paging types) or one indication per paged UE, e.g. one indicator per included group paging identifier (i.e. one per bit, or activated bit, in the bitmap case and one per truncated (or hashed short) UE identifier in the truncated (hashed) UE ID case.

Note that when not combined with embodiment 1, indicating whether the CN or the RAN initiated the paging is equivalent to indicating whether the group paging identifier is derived from the S-TMSI or the I-RNTI. This excludes the exceptional error cases where the S-TMSI is not available and the IMSI therefore is used instead. In such cases, regular paging (i.e. not response-driven paging) has to be used, unless the extension described in section 5.5 is used.

Embodiment 4: Configuring Different Paging Channels for CN Initiated and RAN Initiated Paging As already mentioned above, one way of differentiating CN such as the NGC node 130 initiated and RAN such as the NG-RAN node 110 initiated paging may be to configure a separate paging channel for each of these two paging types. Such a configuration could comprise time and/or frequency transmission resources (such as OFDM symbols slots or subframes and/or OFDM subcarriers), e.g. in terms of CORESET and/or search space. The configuration could further comprise properties like DMRS and scrambling sequence.

With this embodiment a UE, such as the UE 120, in RRC_INACTIVE state would monitor both paging channels, i.e. both the paging channel for RAN initiated paging and the paging channel for CN initiated paging, while a UE in RRC_IDLE state would only monitor the paging channel for CN initiated paging.

Note that when not combined with embodiment 1, a property of this embodiment is that for response-driven paging transmitted on the paging channel for RAN initiated paging the group paging identifier would be derived from the I-RNTI, while for response-driven paging transmitted on the paging channel for CN initiated paging the group paging identifier would be derived from the S-TMSI. This excludes the exceptional error cases where the S-TMSI is not available and the IMSI therefore is used instead. In such cases, regular paging (i.e. not response-driven paging) has to be used, unless the extension described in section 5.5 is used (e.g. configuring a third paging channel to be used when the UE ID (e.g. used for group paging identifier derivation in response-driven paging) is the IMSI).

Extension to Cover Paging Using a Group Paging Identifier Derived from the IMSI

If desired, the above embodiments 2-4 may be extended to cover also cases where the group paging identifier is derived from the IMSI in response-driven paging For embodiments 2a, an additional P-RNTI would have to be configured to indicate that the concerned UE ID is the IMSI (unless the unified group paging identifier derivation of embodiment 1 with the alternative to always derive the group paging identifier from the IMSI is used).

For embodiment 2b and 3, the paging type indicator (in the DCI on the PDCCH in embodiment 2b and in the PDSCH message in embodiment 3) would have to be extended, e.g. from 1 to 2 bits, to be able to indicate three different UE ID cases: S-TMSI, I-RNTI, IMSI.

For embodiment 4, an additional paging channel would have to be configured to be used when the paging is based on the IMSI. An alternative could be to use the same paging channel both when the UE ID is the S-TMSI and when it is the IMSI and to indicate on the PDCCH or PDSCH which one of these two UE IDs is used.

Embodiment 1 may or may not be combined with the embodiments 2-4.

The essence of embodiment 1 may be expressed as configuring a UE, such as the UE 120, to derive a group paging identifier to be associated with the UE from a first identifier associated with the UE and use the derived group paging identifier for identifying group paging identifier matches in response-driven paging, irrespective of UE state and initiator of the paging. The UE ID (first identifier) from which to derive the group paging identifier should preferably be hardcoded in the standard (preferably the S-TMSI or a certain UE-unique part of it), but that could be seen as one form of configuration. Possibly other configuration means should be mentioned as alternatives, just for the sake of it, e.g. configuration via the system information. Note that both the UE and the network perform the same paging initiator independent derivation of the UE's group paging identifier.

For embodiments 2-4, the essence may be expressed as indicating the initiator of the paging, or the UE ID from which the group paging identifier is derived from in response-driven paging, on the paging related transmission on the PDCCH or on the PDSCH (which supposedly covers also that the indication comes in the form of different PDCCH configurations in order to cover also embodiment 4). In dependent claims for the UE, the aspects of choosing UE ID to derive group paging identifier from and potential early abort of PDCCH processing could be brought up.

Figure 2:
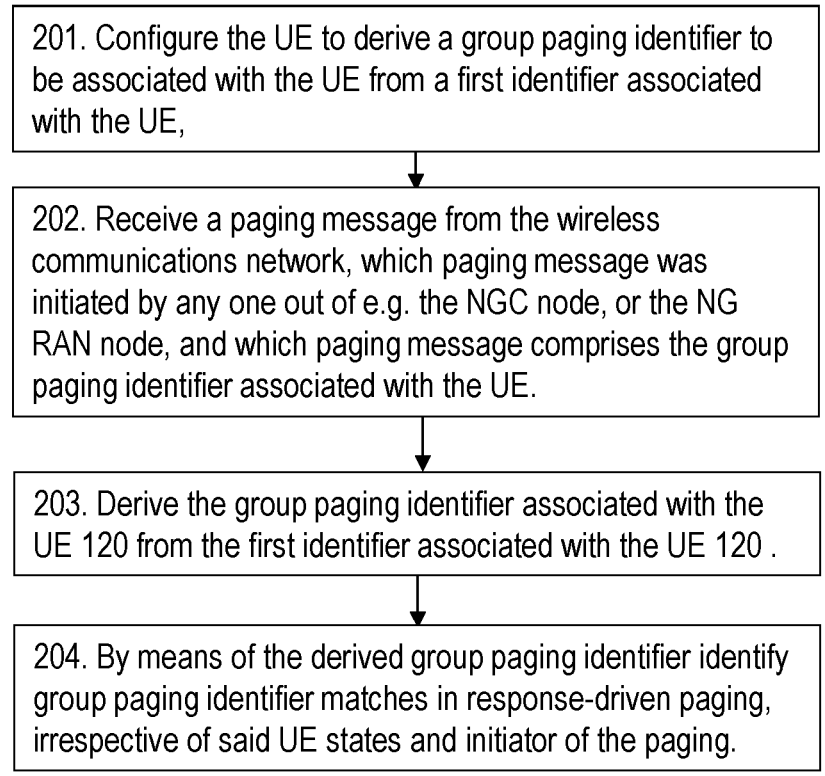
FIG. 2 is a flowchart depicting embodiments of a method in a UE

Example embodiments of a method performed by the UE 120 for handling a paging message in a wireless communications network 100, will now be described as seen from the perspective of the UE 120, with reference to a flowchart depicted in FIG. 2. The UE 120 may in some embodiments be in at least any of the UE states out of: RRC inactive state and RRC idle state.

This relate to some embodiments described above on in this document. The method may comprise one or more of the following actions which actions may be taken in any suitable order.

Action 201

The UE 120 configures the UE 120 to derive a group paging identifier to be associated with the UE 120. The group paging identifier is derived from a first identifier associated with the UE 120. It further configures the UE 120 to use the derived group paging identifier for identifying group paging identifier matches in response-driven paging, irrespective of UE state and initiator of the paging.

In some embodiments, the same type of first identifier is always used as the derivation source, irrespective of whether the paging is initiated by a Core network, CN, or a Radio Access Network, RAN.

In some embodiments, information about the initiator of the paging procedure is provided through a transmission on any one of a Physical Downlink Control Channel (PDCCH) and a Physical Downlink Shared Channel (PDSCH).

The actual paging message reaching the UE 120 may be transmitted by the RAN. So, the "initiator" may refer to the party initiating the whole paging procedure. For CN initiated paging, a CN node may instruct one or more gNBs to send paging messages to the UE 120. For RAN initiated paging, the anchor gNB may instruct itself in a manner of speaking and potentially other gNBs to send paging messages to the UE 120.

Action 202

The UE 120 receives a paging message from the wireless communications network 100. The paging message may e.g. be received as part of response-driven paging. The paging message comprises the group paging identifier associated with the UE 120.

The paging message was e.g. initiated by any one out of the NGC node 130, or the NG RAN node 110.

Action 203

The UE 120 derives the group paging identifier associated with the UE 120 from the first identifier associated with the UE 120.

Action 204

By means of the derived group paging identifier, the UE 120 then identifies group paging identifier matches in response-driven paging irrespective of said UE states and initiator of the paging.

The identifying of the group paging identifier matches in response-driven paging, irrespective of said UE states and initiator of the paging, may be performed by comparing the derived group paging identifier with the group paging identifier received in the paging message.

The group paging identifier may e.g. be any one out of: a short identifier or a group paging identifier in the form of a bit in a bitmap.

In some embodiments, the group paging identifier is a shorter identifier than the first identifier, and any one out of: is derived through truncation or hashing, or have the form of a bit in a bitmap, wherein each bit in the bitmap indicates presence or absence of a certain group paging identifier.

Figure 3:
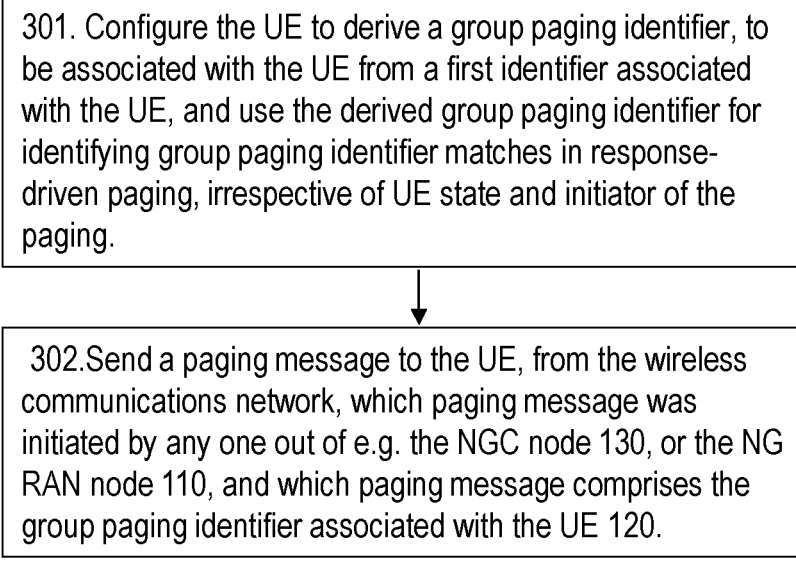
FIG. 3 is a flowchart depicting embodiments of a method in a network node.

Example embodiments of a method performed by a network node 110, 130 for configuring a UE 120 to handling a paging message in a wireless communications network 100, will now be described with reference to a flowchart depicted in FIG. 3. This relate to some embodiments described above on in this document. The network node 110, 130 may be any one out of an NGC node 130, or the NG RAN node 110. The UE 120 may e.g. be in at least any of the UE states out of: RRC inactive state and RRC idle state. The method may comprise one or more of the following actions which actions may be taken in any suitable order.

Action 301

The network node 110, 130 configures the UE 120 to derive a group paging identifier to be associated with the UE 120. The group paging identifier is to be derived from a first identifier associated with the UE 120. The network node 110, 130 further configures the UE 120 to use the derived group paging identifier for identifying group paging identifier matches in response-driven paging, irrespective of UE state and initiator of the paging.

Action 302

The network node 110, 130 sends a paging message to the UE 120. The paging message comprises the group paging identifier associated with the UE 120 enabling the UE 120 to derive the group paging identifier associated with the UE 120 from the first identifier associated with the UE 120, and to by means of the derived group paging identifier identify group paging identifier matches in response-driven paging, irrespective of said UE states and initiator of the paging. This may e.g. be performed by comparing the derived group paging identifier with the group paging identifier received in the paging message.

The paging message may have been initiated by any one out of the NGC node 130, or the NG RAN node 110.

The group paging identifier may be any one out of a short identifier or a group paging identifier in the form of a bit in a bitmap.

In some embodiments, the group paging identifier is a shorter identifier than the first identifier, and any one out of: is derived through truncation or hashing, or have the form of a bit in a bitmap, wherein each bit in the bitmap indicates presence or absence of a certain group paging identifier.

Figure 4:
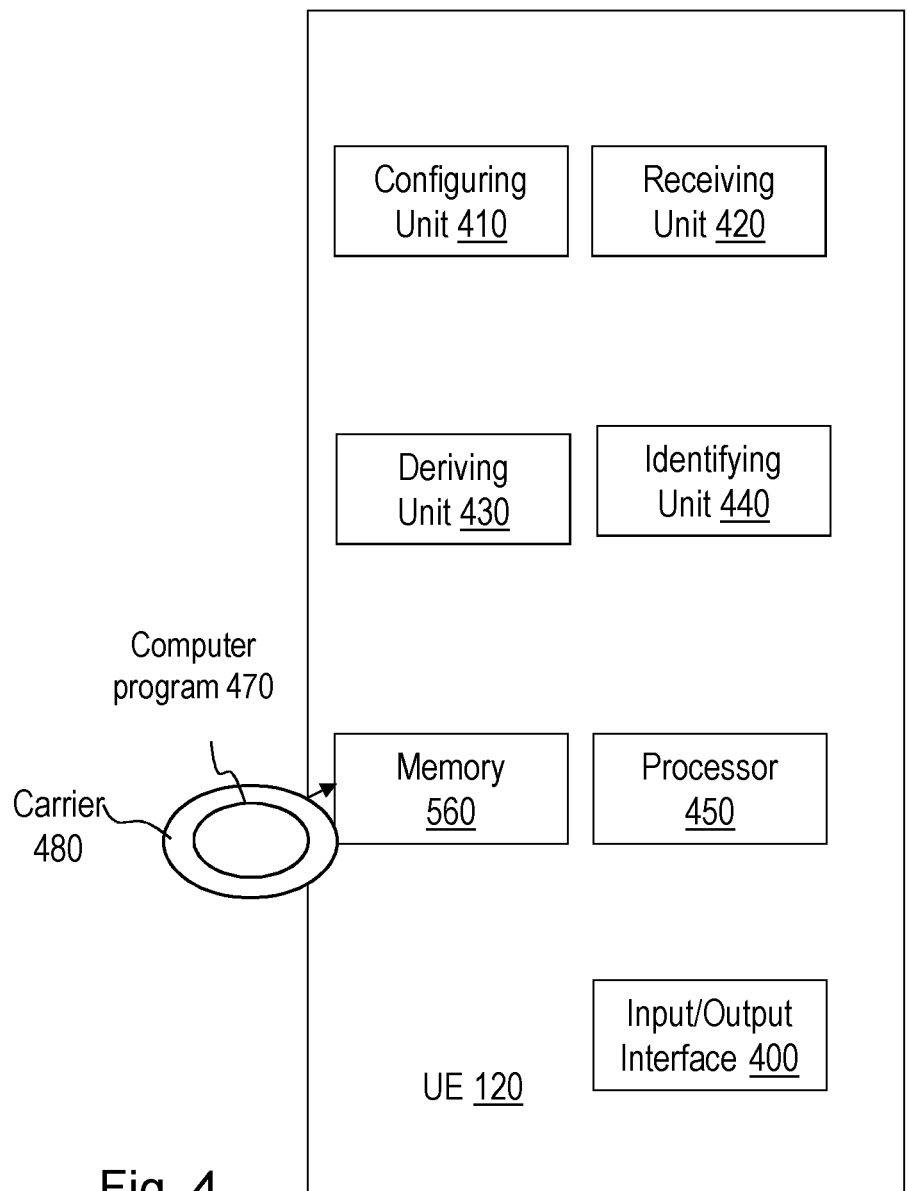
FIG. 4 is a schematic block diagram illustrating embodiments of a UE.

FIG. 4 shows an example of the UE 120.

To perform the method for handling a paging message in a wireless communications network, the UE 120 may comprise the arrangement depicted in FIG. 4. The first UE 120 may e.g. comprise a configuring unit 410, a receiving unit 420, a deriving unit 430, and an identifying unit 440.

Figure 5:
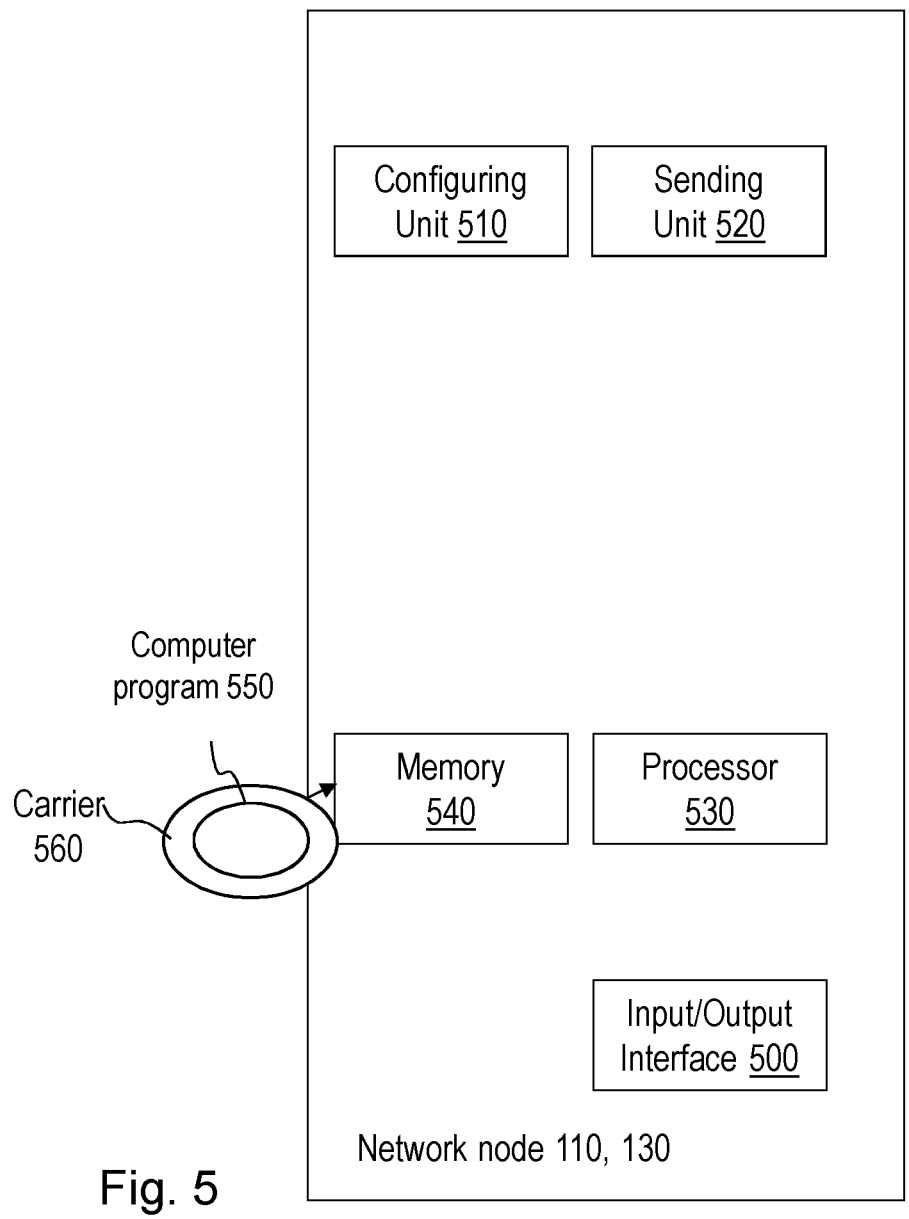
FIG. 5 is a schematic block diagram illustrating embodiments of a first network node.

FIG. 5 shows an example of the network node 110, 130.

To perform the method for configuring a UE (120) to handling a paging message in a wireless communications network, the network node 110, 130 may comprise the arrangement depicted in FIG. 5. The network node 110, 130 may e.g. comprise a configuring unit 510, and a sending unit 520.

The network node 110, 130, e.g. the NGC node 130, or the NG RAN node 110 or the and the UE 120 may comprise an input and output interface configured to communicate with each other. The input and output interface may comprise a wireless receiver not shown and a wireless transmitter not shown.

The embodiments herein may be implemented through a respective processor or one or more processors, such as the processor 530 of a processing circuitry in the network node 110, 130 and the processor 450 of a processing circuitry in the UE 120 depicted in FIGS. 4 and 5 together with computer program code for performing the functions and actions of the embodiments herein. The program code mentioned above may also be provided as a computer program product, for instance in the form of a data carrier carrying computer program code for performing the embodiments herein when being loaded into the network node 110, 130 and the UE 120. One such carrier may be in the form of a CD ROM disc. It is however feasible with other data carriers such as a memory stick. The computer program code may furthermore be provided as pure program code on a server and downloaded to the network node 110, 130 and the UE 120.

The network node 110, 130 and the UE 120 may further comprise respective a memory 540, 460 comprising one or more memory units. The memory comprises instructions executable by the processor in the network node 110 and the UE 120.

The respective memory 540, 460 is arranged to be used to store e.g. packet formats, information, data, configurations, and applications to perform the methods herein when being executed in the network node 110, 130 and the UE 120.

In some embodiments, a respective computer program 550, 470 comprises instructions, which when executed by the at least one processor, cause the at least one processor of the network node 110, 130 and the UE 120 to perform the actions above.

In some embodiments, a respective carrier 560, 480 comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the units in the network node 110, 130 and the UE 120, described above may refer to a combination of analog and digital circuits, and/or one or more processors configured with software and/or firmware, e.g. stored in the network node 110, 130 and the UE 120, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments below relate to the embodiments above but do not correspond to the exact order of the embodiments above.

Embodiment 1

A method performed by a User Equipment, UE, 120 e.g. for handling a paging message in a wireless communications network 100, which UE 120 e.g. may be in at least any of the UE states out of: RRC inactive state and RRC idle state, the method comprising:

configuring 201 the UE to derive a group paging identifier, e.g. a short identifier or a group paging identifier in the form of a bit in a bitmap, to be associated with the UE 120 from a first identifier associated with the UE 120, and use the derived group paging identifier for identifying group paging identifier matches in response-driven paging, irrespective of UE state and initiator of the paging, e.g. wherein the group paging identifier e.g. may be a shorter identifier than the first identifier, e.g. derived through truncation or hashing, or may have the form of a bit in a bitmap, wherein each bit in the bitmap may indicate presence or absence of a certain group paging identifier receiving, 202 a paging message, e.g. as part of response-driven paging, from the wireless communications network 100, which paging message was initiated by any one out of e.g. the NGC node 130, or the NG RAN node 110, and which paging message comprises the group paging identifier associated with the UE 120, deriving 203 the group paging identifier associated with the UE 120 from the first identifier associated with the UE 120, by means of the derived group paging identifier identifying 204 group paging identifier matches in response-driven paging, irrespective of said UE states and initiator of the paging, e.g. by comparing the derived group paging identifier with the group paging identifier received in the paging message.

Embodiment 2

The method according to Embodiment 1, wherein the same e.g. type of first identifier always is used as the derivation source, irrespective of whether the paging is initiated by the CN such as the NGC node 130 or the RAN such as the NG RAN node 110.

Embodiment 3

A method e.g. according to Embodiment 1 performed by a User Equipment, UE, 120 e.g. for handling a paging message in a wireless communications network 100, which UE 120 e.g. may be in at least any of the UE states out of: RRC inactive state and RRC idle state, the method comprising:

receiving, 202 a paging message from the wireless communications network 100, which paging was initiated by an initiator comprising any one out of e.g. the NGC node 130, the 5GC node 130 or the NG RAN node 110, wherein the paging message comprises a group paging identifier, and wherein the paging message, through its content, CRC or transmission property, e.g. channel configuration, provides information about the initiator of the paging, e.g. the paging procedure, deriving 203 a group paging identifier associated with the UE 120 from one out of one or more UE IDs, wherein which UE ID to use is indicated by the information about the initiator of the paging, e.g. paging procedure, by means of the derived group paging identifier identifying 204 group paging identifier matches in response-driven paging, irrespective of said UE states and initiator of the paging.

Embodiment 4

The method according to Embodiment 3, wherein the information about the initiator of the paging [procedure] is provided through a transmission on any one of a PDCCH and a PDSCH.

The actual paging message reaching the UE is always transmitted by the RAN. So, the "initiator" refers the party initiating the whole paging procedure. For CN initiated paging, a CN node instructs one or more gNBs to send paging messages to the UE. For RAN initiated paging, the anchor gNB instructs itself in a manner of speaking and potentially other gNBs to send paging messages to the UE.

Embodiment 5

A computer program comprising instructions, which when executed by a processor, causes the processor to perform actions according to any of the Embodiment 1-4.

Embodiment 6

A carrier comprising the computer program of Embodiment 5, wherein the carrier is one of an electronic signal, an optical signal, an electromagnetic signal, a magnetic signal, an electric signal, a radio signal, a microwave signal, or a computer-readable storage medium.

Embodiment 7

A method performed by a network node 110, 130 such as a the NGC node 130, or the NG RAN node 110, e.g. for configuring a UE 120 to handling a paging message in a wireless communications network 100, which UE 120 e.g. may be in at least any of the UE states out of: RRC inactive state and RRC idle state, the method comprising:

configuring 301 the UE to derive a group paging identifier, e.g. a short identifier or a group paging identifier in the form of a bit in a bitmap, to be associated with the UE 120 from a first identifier associated with the UE 120, and use the derived group paging identifier for identifying group paging identifier matches in response-driven paging, irrespective of UE state and initiator of the paging, e.g. wherein the group paging identifier e.g. may be a shorter identifier than the first identifier, e.g. derived through truncation or hashing, or may have the form of a bit in a bitmap, wherein each bit in the bitmap may indicate presence or absence of a certain group paging identifier sending, 302 a paging message to the UE 120, e.g. as part of response-driven paging, from the wireless communications network 100, which paging message was initiated by any one out of e.g. the NGC node 130, or the NG RAN node 110, and which paging message comprises the group paging identifier associated with the UE 120 enabling the UE 120 to derive the group paging identifier associated with the UE 120 from the first identifier associated with the UE 120, and to by means of the derived group paging identifier identify group paging identifier matches in response-driven paging, irrespective of said UE states and initiator of the paging, e.g. by comparing the derived group paging identifier with the group paging identifier received in the paging message.

Embodiment 8

A method e.g. according to Embodiment 7 performed by a network node 110, 130 such as a the NGC node 130, or the NG RAN node 110, e.g. for handling a paging message in a wireless communications network 100, which UE 120 e.g. may be in at least any of the UE states out of: RRC inactive state and RRC idle state, the method comprising:

sending, 302 a paging message from the wireless communications network 100, which paging was initiated by an initiator comprising any one out of e.g. the NGC node 130, the 5GC node 130 or the NG RAN node 110, wherein the paging message comprises a group paging identifier, and wherein the paging message, through its content, CRC or transmission property, e.g. channel configuration, provides information about the initiator of the paging, e.g. the paging procedure, enabling the UE 120 to derive a group paging identifier associated with the UE 120 from one out of one or more UE IDs, wherein which UE ID to use is indicated by the information about the initiator of the paging, e.g. paging procedure, and to by means of the derived group paging identifier identify group paging identifier matches in response-driven paging, irrespective of said UE states and initiator of the paging.

Embodiment 9

A computer program comprising instructions, which when executed by a processor, causes the processor to perform actions according to any of the Embodiment 7-8.

Embodiment 10

A carrier comprising the computer program of Embodiment 9, wherein the carrier is one of an electronic signal, an optical signal, an electromagnetic signal, a magnetic signal, an electric signal, a radio signal, a microwave signal, or a computer-readable storage medium.

Embodiment 11

A User Equipment, UE, 120 e.g. for handling a paging message in a wireless communications network 100, which UE 120 e.g. may be capable to be in at least any of the UE states out of: RRC inactive state and RRC idle state, the UE 120 being configured to:

configure, e.g. by means of a configuring unit 410, the UE to derive a group paging identifier, e.g. a short identifier or a group paging identifier in the form of a bit in a bitmap, to be associated with the UE 120 from a first identifier associated with the UE 120, and use the derived group paging identifier for identifying group paging identifier matches in response-driven paging, irrespective of UE state and initiator of the paging, e.g. wherein the group paging identifier e.g. may be a shorter identifier than the first identifier, e.g. derived through truncation or hashing, or may have the form of a bit in a bitmap, wherein each bit in the bitmap may indicate presence or absence of a certain group paging identifier, receive e.g. by means of a receiving unit 420, a paging message, e.g. as part of response-driven paging, from the wireless communications network 100, which paging message was initiated by any one out of e.g. the NGC node 130, or the NG RAN node 110, and which paging message comprises the group paging identifier associated with the UE 120, derive e.g. by means of a deriving unit 430, the group paging identifier associated with the UE 120 from the first identifier associated with the UE 120, and by means of the derived group paging identifier identify e.g. by means of a identifying unit 440, group paging identifier matches in response-driven paging, irrespective of said UE states and initiator of the paging, e.g. by comparing the derived group paging identifier with the group paging identifier received in the paging message.

Embodiment 12

The method according to Embodiment 11, wherein the same e.g. type of first identifier always is adapted to be used as the derivation source, irrespective of whether the paging is initiated by the CN such as the NGC node 130 or the RAN such as the NG RAN node 110.

Embodiment 13

A UE 120 e.g. according to Embodiment 11 e.g. for handling a paging message in a wireless communications network 100, which UE 120 e.g. may be adapted to be in at least any of the UE states out of: RRC inactive state and RRC idle state, the UE 120 being configured to:

Receive e.g. by means of a receiving unit 420, a paging message from the wireless communications network 100, which paging was initiated by an initiator comprising any one out of e.g. the NGC node 130, the 5GC node 130 or the NG RAN node 110, wherein the paging message comprises a group paging identifier, and wherein the paging message, through its content, CRC or transmission property, e.g. channel configuration, provides information about the initiator of the paging, e.g. the paging procedure, Derive e.g. by means of a deriving unit 430, a group paging identifier associated with the UE 120 from one out of one or more UE IDs, wherein which UE ID to use is indicated by the information about the initiator of the paging, e.g. paging procedure, by means of the derived group paging identifier identify e.g. by means of a identifying unit 440, group paging identifier matches in response-driven paging, irrespective of said UE states and initiator of the paging.

Embodiment 14

The UE 120 according to Embodiment 13, wherein the information about the initiator of the paging [procedure] is provided through a transmission on any one of a PDCCH and a PDSCH.

Embodiment 15

A network node 110, 130 such as a the NGC node 130, or the NG RAN node 110, e.g. for configuring a UE 120 to handling a paging message in a wireless communications network 100, which UE 120 e.g. may be adapted to be in at least any of the UE states out of: RRC inactive state and RRC idle state, the network node 110, 130 being configured to:

configure, e.g. by means of a configuring unit 510, the UE to derive a group paging identifier, e.g. a short identifier or a group paging identifier in the form of a bit in a bitmap, to be associated with the UE 120 from a first identifier associated with the UE 120, and use the derived group paging identifier for identifying group paging identifier matches in response-driven paging, irrespective of UE state and initiator of the paging, e.g. wherein the group paging identifier e.g. may be a shorter identifier than the first identifier, e.g. derived through truncation or hashing, or may have the form of a bit in a bitmap, wherein each bit in the bitmap may indicate presence or absence of a certain group paging identifier send, e.g. by means of a sending unit 520, a paging message to the UE 120, e.g. as part of response-driven paging, from the wireless communications network 100, which paging message was initiated by any one out of e.g. the NGC node 130, or the NG RAN node 110, and which paging message comprises the group paging identifier associated with the UE 120 enabling the UE 120 to derive the group paging identifier associated with the UE 120 from the first identifier associated with the UE 120, and to by means of the derived group paging identifier identify group paging identifier matches in response-driven paging, irrespective of said UE states and initiator of the paging, e.g. by comparing the derived group paging identifier with the group paging identifier received in the paging message.

Embodiment 16

A network node 110, 130 e.g. according to Embodiment 15 performed by a network node 110, 130 such as a the NGC node 130, or the NG RAN node 110, e.g. for handling a paging message in a wireless communications network 100, which UE 120 e.g. may be in at least any of the UE states out of: RRC inactive state and RRC idle state, the network node 110, 130 being configured to:

send, e.g. by means of a sending unit 520, a paging message from the wireless communications network 100, which paging was initiated by an initiator comprising any one out of e.g. the NGC node 130, the 5GC node 130 or the NG RAN node 110, wherein the paging message comprises a group paging identifier, and wherein the paging message, through its content, CRC or transmission property, e.g. channel configuration, provides information about the initiator of the paging, e.g. the paging procedure, enabling the UE 120 to derive a group paging identifier associated with the UE 120 from one out of one or more UE ID(s), wherein which UE ID to use is indicated by the information about the initiator of the paging, e.g. paging procedure, and to by means of the derived group paging identifier identify group paging identifier matches in response-driven paging, irrespective of said UE states and initiator of the paging.

Figure 6:
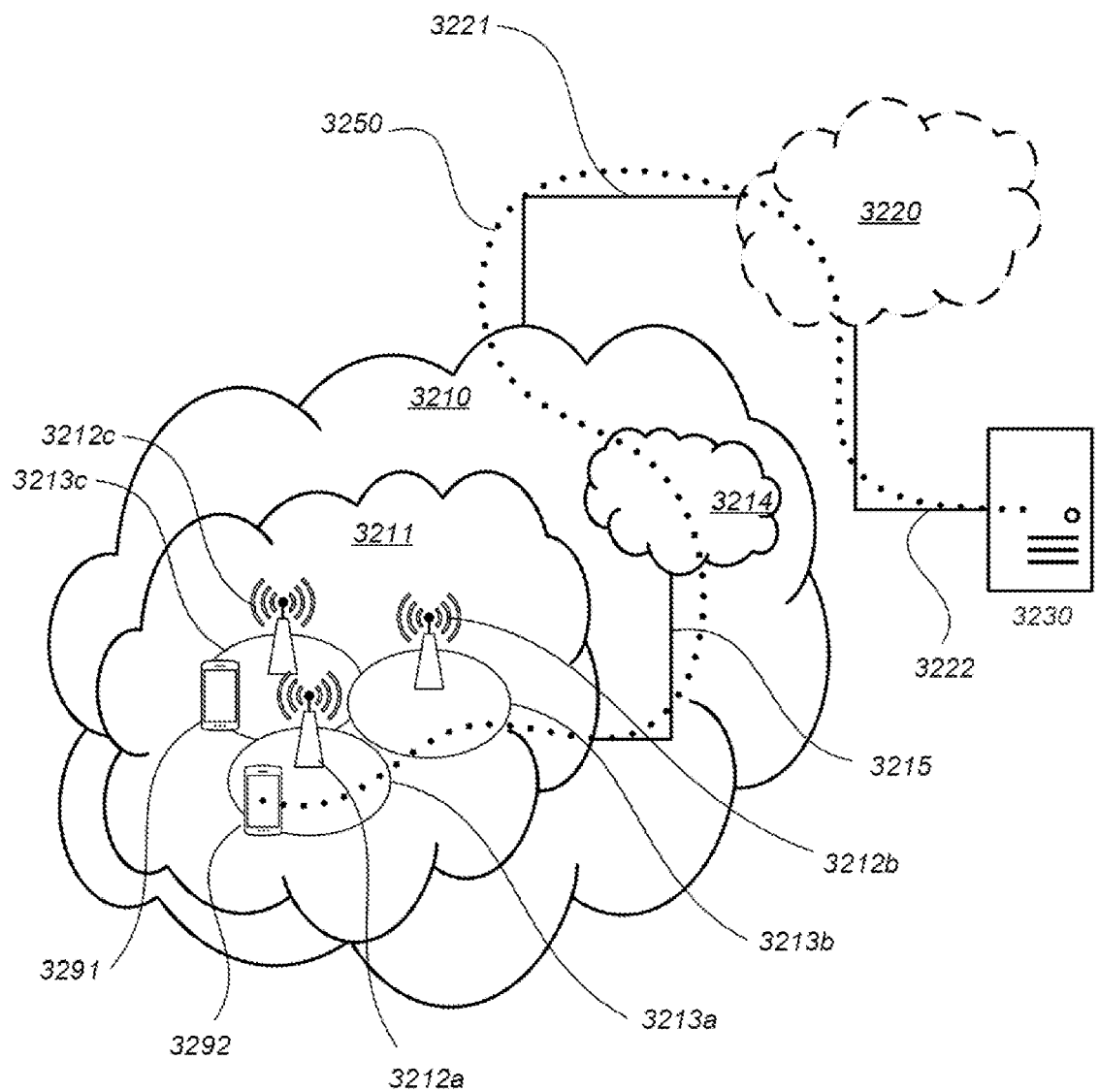
FIG. 6 schematically illustrates a telecommunication network connected via an intermediate network to a host computer.

With reference to FIG. 6, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 6 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 7. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 7) served by the base station 3320. The communication interface 3326 may be configured to facilitate a connection 3360 to the host computer 3310. The connection 3360 may be direct or it may pass through a core network (not shown in FIG. 7) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 7 may be identical to the host computer 3230, one of the base stations 3212a, 3212b, 3212c and one of the UEs 3291, 3292 of FIG. 6, respectively. This is to say, the inner workings of these entities may be as shown in FIG. 7 and independently, the surrounding network topology may be that of FIG. 6.

Figure 7:
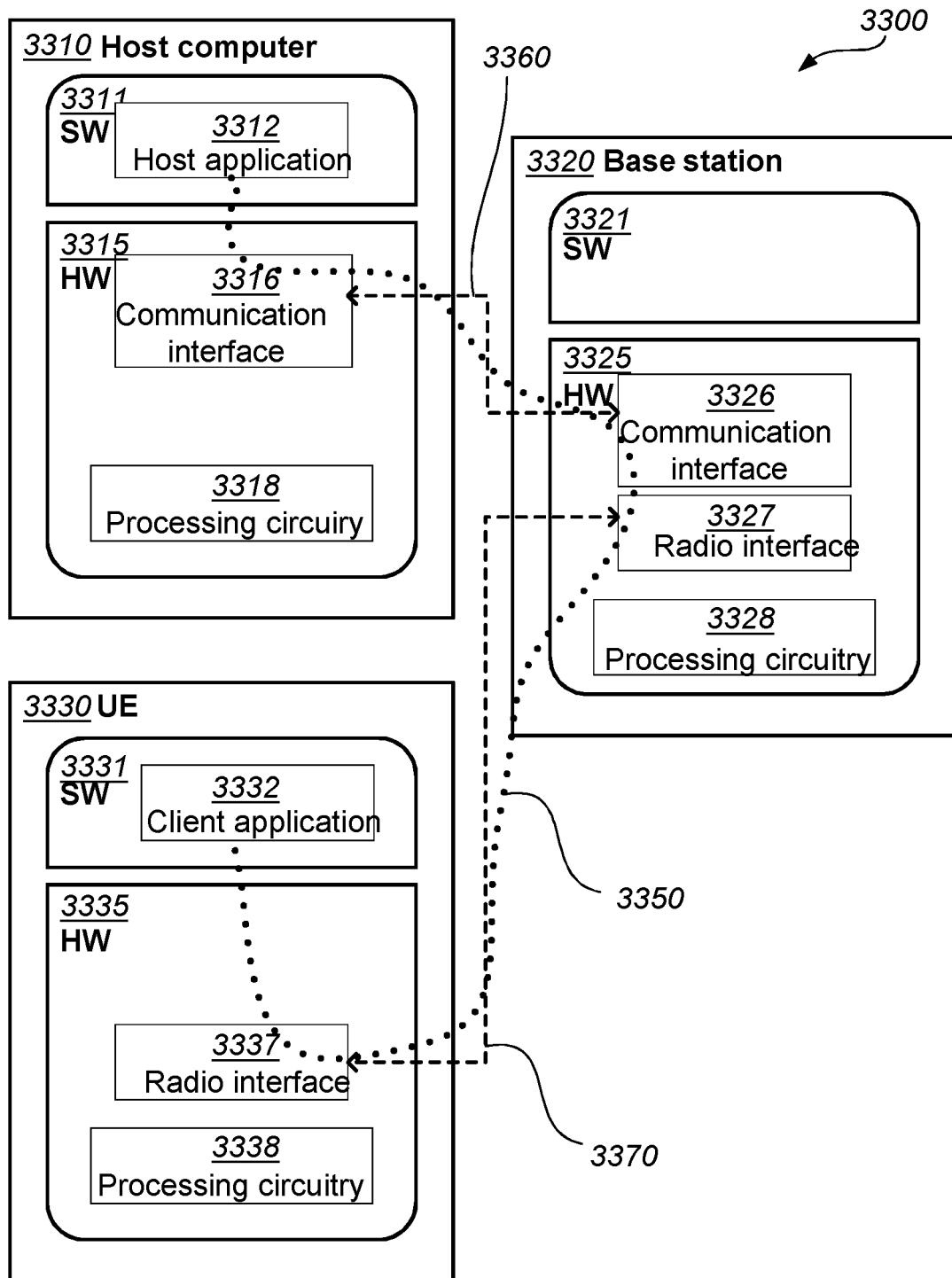
FIG. 7 is a generalized block diagram of a host computer communicating via a base station with a user equipment over a partially wireless connection.

In FIG. 7, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. [If the radio-related invention has not yet been formulated at the time of drafting a provisional application, the expression "embodiments described throughout this disclosure" is meant to refer to the radio-related embodiments disclosed elsewhere in the application.] One or more of the various embodiments improve the performance of OTT services provided to the UE 3330 using the OTT connection 3350, in which the wireless connection 3370 forms the last segment. More precisely, the teachings of these embodiments may improve the [select the applicable RAN effect: data rate, latency, power consumption] and thereby provide benefits such as [select the applicable corresponding effect on the OTT service: reduced user waiting time, relaxed restriction on file size, better responsiveness, extended battery lifetime].

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

[FIGS. 34 and 35 and the corresponding text are about a downstream aspect of the radio-related invention, while FIGS. 36 and 37 and the corresponding text discuss an upstream aspect. If only one aspect is applicable for an invention, then, because the text and drawings are self-contained for each aspect, the text and drawings for the other aspect may be omitted without disadvantage.]

Figures 8, 9:
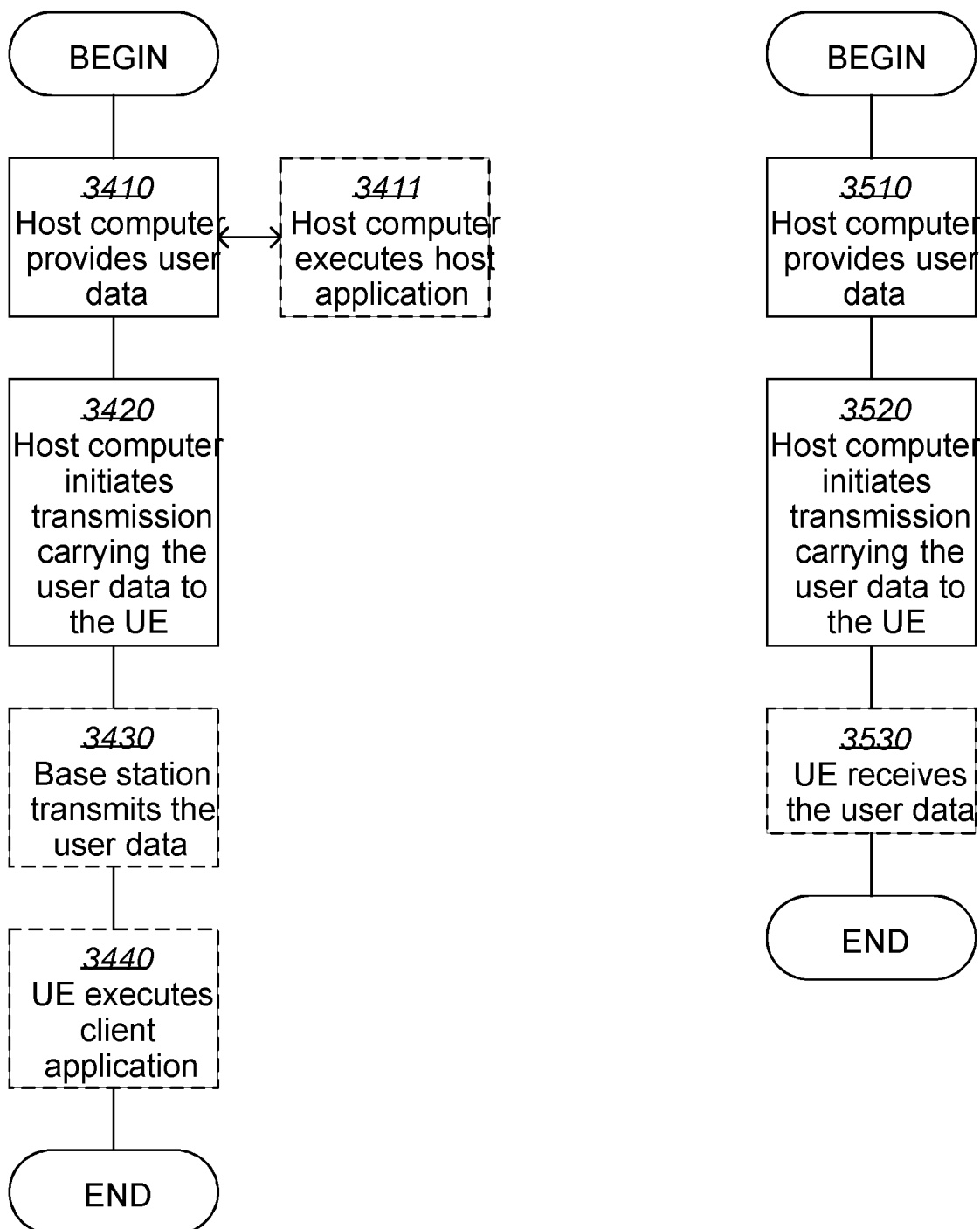

FIG. 8 is a flowchart illustrating a method implemented in a communication system, in accordance with one embodiment. The communication system includes a host computer, a base station such as an AP STA, and a UE such as a Non-AP STA which may be those described with reference to FIG. 6 and FIG. 7. For simplicity of the present disclosure, only drawing references to FIG. 8 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 9 is a flowchart illustrating a method implemented in a communication system, in accordance with one embodiment. The communication system includes a host computer, a base station such as an AP STA, and a UE such as a Non-AP STA which may be those described with reference to FIG. 6 and FIG. 7. For simplicity of the present disclosure, only drawing references to FIG. 9 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 10 is a flowchart illustrating a method implemented in a communication system, in accordance with one embodiment. The communication system includes a host computer, a base station such as an AP STA, and a UE such as a Non-AP STA which may be those described with reference to FIG. 6 and FIG. 7. For simplicity of the present disclosure, only drawing references to FIG. 10 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station such as an AP STA, and a UE such as a Non-AP STA which may be those described with reference to FIG. 6 and FIG. 7. For simplicity of the present disclosure, only drawing references to FIG. 11 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

ABBREVIATIONS

Abbreviation Explanation
3GPP 3rd Generation Partnership Project
5G 5th Generation
5GC 5th Generation Core
AMF Access and Mobility Function
CN Core Network
CRC Cyclic Redundancy Check
DCI Downlink Control Information
DL Downlink
DRX Discontinuous Reception
eNB Evolved NodeB
EPS Evolved Packet System
ETWS Earthquake and Tsunami Warning System
gNB The term for a radio base station in NR (corresponding to eNB in LTE).
HF High Frequency/High Frequencies
ID Identity/Identifier
IMSI International Mobile Subscriber Identity
I-RNTI Inactive Radio Network Temporary Identifier
LTE Long Term Evolution
MIB Master Information Block
MME Mobility Management Entity
NAS Non-Access Stratum
NGC Next Generation Core
NG-RAN Next Generation RAN
NR New Radio (The term used for the 5G radio interface and radio access network in the technical reports and standard specifications 3GPP are working on.)
PDCCH Physical Downlink Control Channel
PDSCH Physical Downlink Shared Channel
PO Paging Occasion
PRACH Physical Random Access Channel
P-RNTI Paging RNTI
RAN Radio Access Network
RNA RAN Notification Area
RNTI Radio Network Temporary Identifier
RRC Radio Resource Control
SAE System Architecture Evolution
SFN Single Frequency Network
S1 The interface between the RAN and the CN in EPS.
S1AP S1 Application Protocol (The control plane signaling protocol used between an eNB and an MME in EPS/LTE.)
SS Synchronization Signal
M-TMSI MME-TMSI
S-TMSI SAE-TMSI
TMSI Temporary Mobile Subscriber Identity
UE User Equipment
UL Uplink

The invention claimed is:

1. A method performed by a User Equipment (UE), the method comprising:
receiving a response-driven page transmitted by a network node of the wireless communication network, the response-driven page indicating a group paging identifier and further indicating whether the response-driven page is initiated by a core network (CN) of the wireless communication network or is initiated by a radio access network (RAN) of the wireless communication network;
responsive to the UE being in an idle state with respect to the RAN and the response-driven page being RAN-initiated, ignoring the response-driven page; and
responsive to the response-driven page being CN-initiated or the UE not being in the idle state with respect to the RAN:
deriving a group paging identifier from a same particular one among one or more temporary identifiers assigned to the UE by the wireless communication network, irrespective of whether the response-driven page is CN-initiated or RAN-initiated; and
responsive to the derived group paging identifier matching the indicated group paging identifier, contacting the network node or another node in the wireless communication network, to determine whether the UE is a target of the response-driven page.

2. The method according to claim 1, wherein the particular temporary identifier is a Serving Temporary Mobile Subscriber Identity (S-TMSI), as assigned by the CN.

3. The method according to claim 1, determining the particular temporary identifier to use for deriving the group paging identifier, according to an explicit or implicit indication provided via signaling transmitted by the wireless communication network.

4. A method performed by a network node in a wireless communications network, the method comprising:
configuring the UE to derive a group paging identifier, to be associated with the UE, from a same particular one among one or more temporary identifiers assigned to the UE by the wireless communication network, irrespective of whether any given response-driven page received by the UE is indicated as being initiated by a core network (CN) of the wireless communication network or initiated by a radio access network (RAN) of the wireless communication network; and
sending, a response-driven page having a corresponding group paging identifier derivable from the particular temporary identifier assigned to the UE, wherein the response-driven page indicates whether the response-driven page is CN-initiated or RAN-initiated.

5. The method according to claim 4, wherein the network node is a Next Generation Core (NGC) node or a Next Generation Radio Access Network (NG RAN) node.

6. The method according to claim 4, wherein the corresponding group paging identifier is a short identifier.

7. A User Equipment (UE), wherein the UE comprises:
communication circuitry configured to receive a response-driven page from the wireless communication network, the response-driven page indicating a group paging identifier and further indicating whether the response-driven page is initiated by a core network (CN) of the wireless communication network or initiated by a radio access network (RAN) of the wireless communication network; and processing circuitry operatively associated with the communication circuitry and configured to:
- responsive to the UE being in an idle state with respect to the RAN and the response-driven page being RAN-initiated, ignore the response-driven page; and
- responsive to the response-driven page being CN-initiated or the UE not being in the idle state with respect to the RAN:
  - derive a group paging identifier from a same particular one among one or more temporary identifiers assigned to the UE by the wireless communication network, irrespective of whether the response-driven page is CN-initiated or RAN-initiated; and
  - responsive to the derived group paging identifier matching the indicated group paging identifier, contact the network node or another node in the wireless communication network, to determine whether the UE is a target of the response-driven page.

8. The UE according to claim 7, wherein the particular temporary identifier is a Serving Temporary Mobile Subscriber Identity (S-TMSIS), as assigned by the CN.

9. The UE according to claim 7, wherein the processing circuitry is configured to determine the particular temporary identifier to use for deriving the group paging identifier, according to an explicit or implicit indication provided via signaling transmitted by the wireless communication network.

10. The UE according to claim 7, wherein, regarding the UE being in an idle state with respect to the RAN, the UE is operative to be in at least any of the UE states out of: Radio Resource Control (RRC) inactive state and RRC idle state.

11. A network node configured for operation in a wireless communications network, the network node comprising:
   communication circuitry configured to send a paging message to the UE; and
   processing circuitry operatively associated with the communication circuitry and configured to:
   - configure the UE to derive a group paging identifier, to be associated with the UE from a same particular one among one or more temporary identifiers assigned to the UE by the wireless communication network, irrespective of whether any given response-driven page received by the UE is indicated as being initiated by a core network (CN) of the wireless communication network or initiated by a radio access network (RAN) of the wireless communication network; and
   - send a response-driven page having a corresponding group paging identifier derivable from the particular temporary identifier assigned to the UE, wherein the response-driven page indicates whether the response-driven page is CN-initiated or RAN-initiated.

12. The network node according to claim 11, wherein the network node is a Next Generation Core (NGC) node or a Next Generation Radio Access Network (NG RAN) node.

13. The network node according to claim 11, wherein the corresponding group paging identifier is a short identifier.

14. The network node according to claim 11, wherein the response-driven page is initiated by the Next Generation Core (NGC) node or the NG Radio Access Network (RAN) node.

* * * * *